United States Patent [19]

Wieder

[11] 4,063,095
[45] Dec. 13, 1977

[54] BALANCING RADIOMETER
[76] Inventor: Solomon Wieder, 17 Blueberry Hill Road, Monsey, N.Y. 10952
[21] Appl. No.: 749,213
[22] Filed: Dec. 10, 1976
[51] Int. Cl.² ............................................. G01J 1/00
[52] U.S. Cl. ................................. 250/338; 250/350; 250/352
[58] Field of Search ................ 250/342, 346, 350, 352
[56] References Cited
U.S. PATENT DOCUMENTS

| 3,487,216 | 12/1969 | Webb | 250/352 |
|---|---|---|---|
| 3,564,252 | 2/1971 | Stoft | 250/350 |
| 3,604,933 | 9/1971 | Cross | 250/352 |
| 3,619,614 | 11/1977 | Tamaka | 250/352 |

Primary Examiner—Harold A. Dixon
Attorney, Agent, or Firm—Hubbell, Cohen Stiefel & Gross

[57] ABSTRACT

A balancing radiometer for measuring the intensity of incident electromagnetic radiation comprises: a pair of identical sensors, each including a thermally conductive substrate, at least one surface of the substrate being comprised of an electrically insulating material, and means disposed on the one surface for resisting the flow of electric current and absorbing incident radiation; means for shielding one of the two sensors from the radiation source, the other sensor being unshielded; means disposed in thermal conducting relation with the substrate of the shielded sensor for providing a first signal proportional to the temperature of the shielded sensor; second means disposed in thermal conducting relation with the substrate of the unshielded sensor for providing a second signal proportional to the temperature of the unshielded sensor; means for comparing the first and second signals; variable power supply means responsive to the signal comparing means; means for connecting the power supply means to the shielded sensor for heating the shielded sensor to a temperature equal to the temperature of the unshielded sensor; and means for measuring the power output of said power supply means.

10 Claims, 5 Drawing Figures

OUTPUT OF SCANNER

BALANCING RADIOMETER

BACKGROUND OF THE INVENTION

1. Field of the Invention

This invention pertains to radiometers and more particularly to balancing radiometers.

2. Prior Art

Devices for measuring incident electromagnetic radiation, commonly referred to as radiometers, are well known and are extensively used to measure incident solar radiation. The most commonly used radiometer is the pyrannometer which measures the temperature difference between silvered and blackened surfaces that are exposed to the sun. The silvered surface reflects the incident solar radiation and thus remains at the ambient temperature. The blackened surface, however, absorbs the incident solar radiation and becomes warm. It is apparent that the temperature difference between the two surfaces is due solely to the incident solar radiation absorbed by the blackened surface. Thus, the pyrannometer measures the temperature difference and correlates this to the incident solar radiation. The accuracy of the device is dependent upon the existence of a fixed relationship between temperature difference and incident radiation. Unfortunately, however, this relationship is not reliable. Thus, on cold and/or windy days, the temperature difference between the two surfaces is reduced for any given radiation intensity. This necessitates the use of correction charts. It is possible to reduce this source of error by enclosing the two sensors in a transparent dome. Unfortunately, the dome produces selective reflection and absorption of the incident electromagnetic radiation and in addition results in artificial heating of the dome interior, which factors introduce further error. The most serious shortcoming of the pyrannometer, however, is that it is precalibrated on the assumption that there is a linear relation between temperature difference and radiative flux. There appears to be neither theoretical nor empirical justification for this premise, and accordingly all the measurements made by the device are subject to doubt.

A partial solution to these problems is found in U.S. Pat. No. 3,564,252 issued to Stoft. While the Stoft radiometer senses energy rather than temperature difference it too has a number of potential sources of error. For example, the interior reflecting converging sidewalls of the chamber will introduce an error due to selective absorption and reflection similar to the error introduced by the transparent dome in the Eppley device described above. Moreover, the Stoft device requires an isothermal chamber as well as a complex chopper assembly thus reducing its portability and increasing its cost.

BRIEF SUMMARY OF THE INVENTION

The balancing radiometer of the present invention is capable of measuring the intensity of electromagnetic radiation emanating from a source of unknown radiant energy, such as the sun.

Identical wafers, each comprising an electrically insulating thermally conducting substrate, a layer of ohmic material disposed on the substrate, and a covering of radiation absorptive material disposed on the ohmic material are juxtaposed with the heat absorptive material in confronting relation with the source. A reflecting shield is disposed in close confronting relation above one of the two wafers in order to shield that wafer from incident electromagnetic radiation. Thus, when the two wafers are exposed to the source, only the unshielded wafer will be heated above ambient temperature. Preferably, the two wafers are disposed on a thermally insulating base such as styrofoam to minimize conduction heat losses and prevent heat conduction between the wafers.

Means are provided for converting the temperature of each of the wafers to a suitable signal such that the temperature of the two wafers may be compared. Preferably, this is accomplished by affixing a thermistor in thermal conducting relation with each of the two wafers. In a preferred embodiment, the two thermistors comprise two arms of a conventional Wheatstone bridge circuit, the other two arms of the circuit being comprised of two identical resistors of known value. Thus, any temperature difference between the two wafers will be reflected in the bridge circuit by a voltage difference signal between the point intermediate the two thermistors and the point intermediate the two fixed resistors. This signal is then fed into a power supply designed to produce a ramp output signal which scans upward or downward depending upon whether the difference signal from the Wheatstone bridge is positive or negative. The power supply output is in turn connected to a pair of electrodes affixed to the ohmic material of the shielded wafer. The scan continues until the power supplied to the shielded wafer is sufficient to equalize its temperature with that of the unshielded wafer. This will in turn balance the bridge circuit and stop the scan. At this point the power supply output is equivalent to the intensity of the source. Thus, by providing suitable means to measure the output of the power supply, such as a chart recorder, a CRT, or a digital display, the intensity of electromagnetic radiation from the unknown source may be accurately determined.

Further features of the radiometer according to the invention will become apparent from the following detailed description and annexed drawings, which disclose certain nonlimiting examples of embodiments preferred at present.

DETAILED DESCRIPTION OF THE PREFERRED EMBODIMENT

Figure 1:
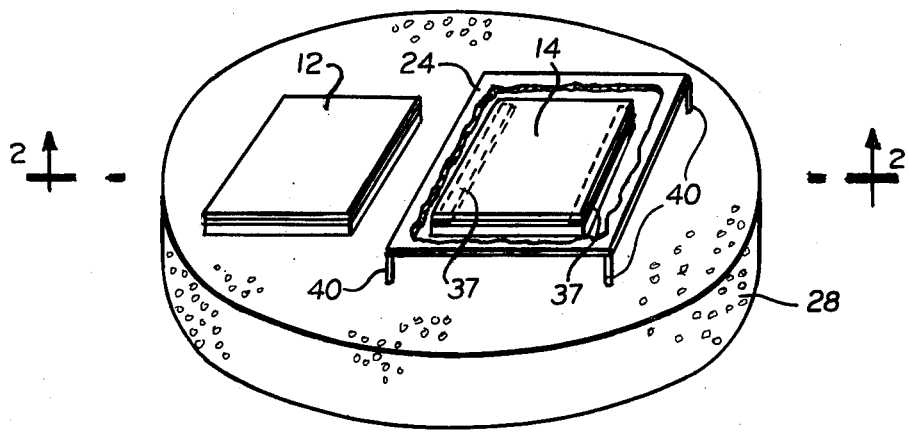
FIG. 1 is a perspective view, partially exploded, showing the preferred solar and heater wafers juxtaposed on a thermally insulating base with the heater wafer shielded.
Figure 2:
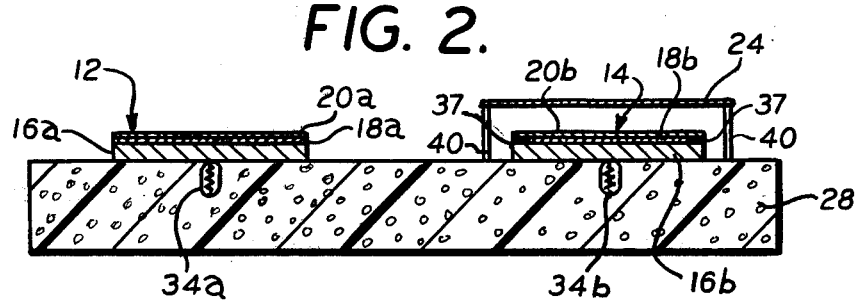
FIG. 2 is a view in vertical section taken along the line 2—2 in FIG. 1.
Figure 4:
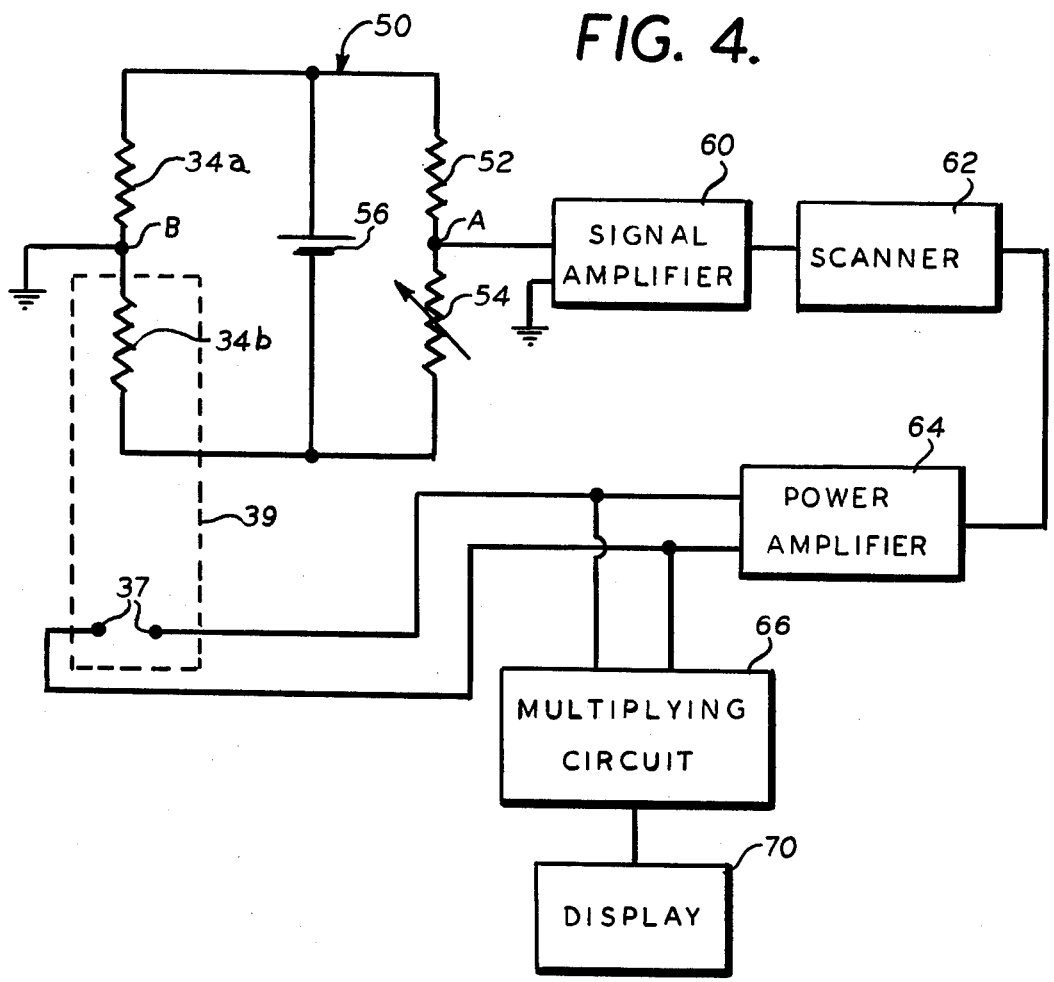
FIG. 4 is a schematic representation of the preferred radiometer according to the present invention.

Referring now to the drawings in detail and particularly to FIGS. 1, 2 and 4 thereof, a balancing radiometer 10 in accordance with the present invention is shown. The radiometer 10 includes a pair of substantially identical wafers 12 and 14. One of the wafers is selected as the "solar" wafer and the other wafers is selected as the "heater" wafer and serves as a control as will be more fully explained hereinafter. While the selection is entirely arbitrary, for purposes of this description the sensor 12 will be designated the solar wafer and the sensor 14 will be designated the heater wafer.

Figure 3:
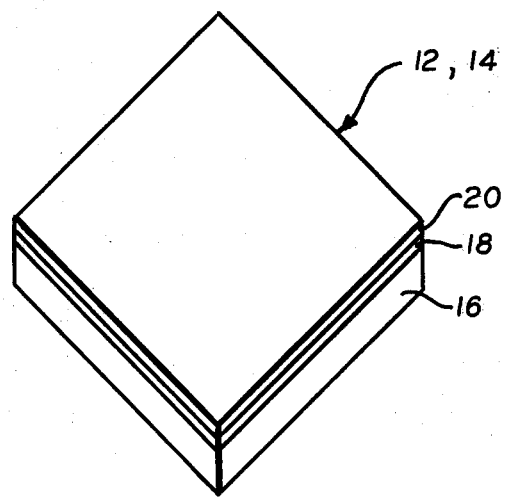
FIG. 3 is a perspective view showing the construction of the wafers according to the present invention.

With particular reference now to FIG. 3, each wafer is constructed in an identical manner and includes a substrate 16 having an ohmic material 18 disposed on the upper surface thereof. A layer of radiation absorptive material 20 is disposed on the exposed surface of the ohmic material 18 and serves to insure substantially complete absorption of electromagnetic radiation incident on the upper surfaces of the wafers whereby substantially all the electromagnetic radiation incident upon the wafers 12 and 14 will be transformed into resistive heating of the ohmic material 18.

It is necessary that the substrate 16 be thermally conductive as well as electrically insulated from the ohmic material 18. As presently preferred, the substrate 16 is comprised of paper, although other suitable materials, such as, for example, beryllia, or a piece of metal coated with an electrically insulating paint may be employed. For reasons that will be more fully apparent hereinafter, it is desirable that the substrate 16 be as thin as possible in order that any fluctuation in the quantum of heat generated in the ohmic material 18 due to variations in the intensity of the incident electromagnetic radiation will be substantially instantaneously conducted through the substrate 16 to the lower surface thereof.

The ohmic material 18 is preferably comprised of graphite although any material having the proper resistance characteristics, such as, for example, a thin film of aluminum or a coil of fine nichrome wire may be employed with success. As presently preferred, the layer of ohmic material 18 is deposited directly onto the surface of the substrate 16, such as, for example, by such a method as vapor deposition, flame spraying, sputtering, screen printing of conductive glaze, plasma spraying, or any other similar technique which yields direct application of the layer 18 onto the substrate 16.

The absorptive material 20 preferably comprises a thin layer of black matte paint such as Parson's lacquer, although any other suitable material which will impart the characteristics of a black body to the wafers 12 and 14 may be employed. Alternatively, if the ohmic material 18 comprises a material having suitable radiation absorption characteristics, as for example, black graphite, the separate layer of absorptive material 20 may be eliminated.

As shown in FIGS. 1 and 2, the wafers 12 and 14 are juxtaposed with their upper surfaces exposed to the source of radiation, such as the sun, whose intensity is to be measured.

Preferably, in order to insure that the thermal environment of both wafers is substantially identical, to avoid heat conduction losses, and to prevent heat conduction between the wafers, the wafers 12 and 14 are disposed on a thermally insulating base, such as, for example, a sytrofoam base 28. In a preferred embodiment, wells (not shown) are provided in base 28 beneath the wafers 12 and 14 to further enhance these effects.

Connected to each wafer are means for converting the temperature sensed by the wafers to a signal proportional thereto such that the temperature difference between the wafers 12 and 14 may be compared. As presently preferred and shown, a thermistor 34 is disposed beneath each of the wafers 12 and 14 in contact with their respective substrates 16. As is well known to those skilled in the art, a thermistor is a passive device whose resistance varies in a known manner with temperature.

Preferably, an adhesive is employed to affix the thermistors to the substrates 16. The adhesive should be of the thermally conductive variety whereby substantially all the heat sensed by the wafers 12 and 14 will be detected by the thermistors 34.

As shown, the heater wafer 14 is provided with a shield 24 which serves to shield the wafer 14 from incident electromagnetic radiation. The shield 24 is supported in close spaced relation from the upper surface of the wafer 14, preferably at a distance of approximately 1 to 3 centimeters by the legs 40. Preferably, and in order to maximize the shielding effect, the shield 24 is constructed of a metallic material, such as, for example, aluminum having an upper silvered surface and a lower blackened surface.

While numerous means are available for converting the difference in resistance between the thermistors 34a and 34b into a suitable signal, the arrangement shown in FIG. 4 is preferred. Thus, the thermistors 34a and 34b are connected in series and form two arms of a conventional Wheatstone bridge circuit 50, the other two arms being comprised of two equal resistors 52 and 54. Preferably, and as shown in FIG. 4, one of the resistors 54 is variable in order that the bridge circuit 50 may be balanced despite variations in the characteristics of one or both of the thermistors 34. In place of resistors 52, 54, a single center-tapped potentiometer could also be employed. As shown, a battery 56 is connected in parallel with the bridge circuit 50.

The radiometer 10 also includes variable power supply means connected to the ohmic material 18b of the wafer 14 whereby the temperature of the wafers 12 and 14 may be equalized. As presently preferred and shown in FIG. 4, the variable power supply means includes a signal amplifier 60, a scanner 62 and a power amplifier 64. As shown, the conventional voltage amplifying device 60 detects and amplifies the voltage difference signal between the point intermediate the resistors 52 and 54 (point A in FIG. 4) and the point intermediate the thermistors 34a and 34b (point B in FIG. 4). As will be readily apparent to the skilled art worker, whenever the voltage difference signal is 0, and assuming the variable resistor 54 has been adjusted such that the resistors 52 and 54 are equal, the resistances of the thermistors 34a and 34b will be identical. This will indicate that the temperatures of the wafers 12 and 14 are also equal.

When there is a voltage difference applied to amplifier 60, as will occur when radiation impinges on wafer 12 and not on shielded wafer 14 thereby raising the temperature of wafer 12 above that of wafer 14, the voltage difference signal, after being amplified by the signal amplifier 60, will then be fed into the conventional scanner 62. Scanner 62 has an output which is an increasing or decreasing ramp voltage signal depending upon whether the signal from the amplifier 60 is positive or negative as will be more fully explained hereinafter. The output of the scanner circuit 62 is then fed into the conventional power amplifier 64.

It will be apparent to the skilled art worker that a variety of means are available for connecting the output of amplifier 64 to the ohmic material 18b. Preferably, this is accomplished as shown in FIGS. 1 and 2 by disposing a pair of electrodes 37 on exposed strips of the ohmic material 18b along one set of opposite edges of the wafer 14. Preferably, the electrodes 37 are comprised of aluminum paint, although any other highly conductive material may also be employed. The electrodes 37 may then be connected to the amplifier 64 by, for example, a pair of wires (as illustrated diagrammatically in FIG. 4).

Means are also provided for measuring the power output from the adjustable power supply 64. This may be accomplished, for example, by a conventional analog multiplying circuit which multiplies the voltage and current outputs of the power amplifier 64 together and produces a power output signal according to the well known formula, Power = Voltage × Current. The output of the multiplying circuit 66 may then be displayed in any well known manner, such as, for example, by a chart recorder, a CRT display, a digital readout, or any combination thereof. The display means are designated by the reference numeral 70 in FIG. 4. By dividing the power output of the amplifier 64 by the surface area of one wafer, the radiative flux of the unknown source may be obtained.

$$\text{flux} = \frac{V \times I}{\text{area of wafer}} = \frac{\text{Power}}{\text{area}}.$$

If desired, a direct readout of the radiative flux of the source may be provided by calibrating the display in Watts/M$^2$, Langleys/min. or $$\frac{\text{BTU's}}{\text{ft.}^2 - \text{hr.}}.$$

Figure 5:
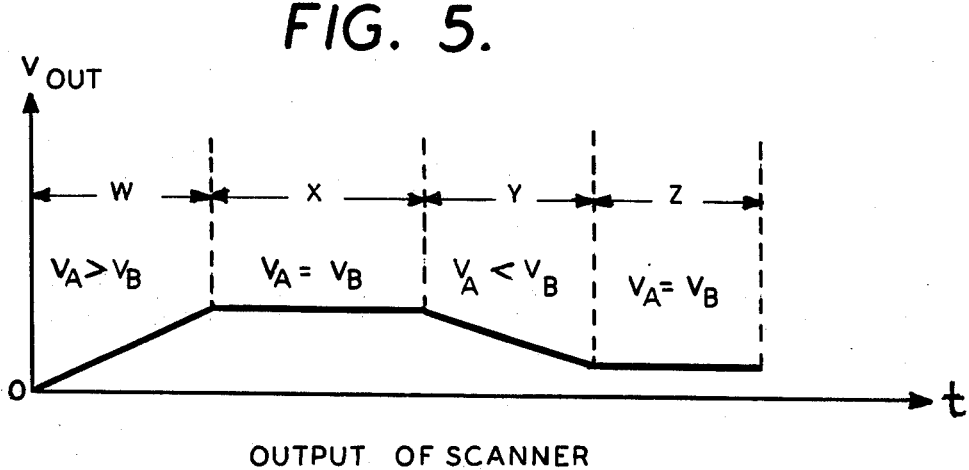
FIG. 5 is a voltage-time graph showing the output of the scanner in FIG. 4.

With reference to FIGS. 1, 2 and 4 the operation of the radiometer 10 will now be described. For purposes of illustration it will be assumed that the intensity of electromagnetic radiation from the sun is to be measured. The solar wafer 12, being exposed to the sun will absorb energy therefrom and become warm. The heater wafer 14 is shielded from the sun by the shield 24 and remains at ambient temperature. As is more fully described above, the temperature difference between the wafers 12 and 14 is translated into a voltage difference signal between points A and B by thermistors 34a and 34b in the Wheatstone bridge circuit 50. Due to the particular arrangement of the circuit 50 shown in FIG. 2, heating of the wafer 12 increases the resistance of the thermistor 34a thus providing a positive input voltage signal to the amplifier 60. The scanner circuit 62 is designed for activation upon receiving an output signal from the amplifier 60. Since the input to the circuit 62 is positive, the output from the scanner will be an increasing voltage ramp such as the ramp 72 illustrated in the "W" portion of the graph in FIG. 5. The output from the scanner 62 is then amplified by power amplifier 64 and applied to the ohmic material 18b of shielded wafer 14 via the electrodes 37 to thus generate heat by the joule effect. This heat is then conducted through the substrate 16b and detected by the thermistor 34b. The dependence of the resistance of thermistor 34b on the power supplied to the wafer 14 via the electrodes 37 is illustrated diagrammatically by the dotted lines 39 in FIG. 4. It will be apparent that the output voltage of the scanner 62 will continuously produce increased heating of the wafer 14 until such time as the heat conducted through the substrate 16b raises the temperature sensed by thermistor 34b to the temperature sensed by thermistor 34a. The resistances of thermistors 34a and 34b will then be equal. This will balance the bridge circuit 50 at which time the output signal from the circuit 50 (measured at point A) and hence the output from the signal amplifier 60 will be zero. The scanner circuit 62 is designed to maintain a steady state output whenever the input received from the amplifier 60 is reduced to zero. This is illustrated by the "X" portion of the graph in FIG. 5.

Inasmuch as both wafers 12 and 14 and their respective thermistors 34 are maintained in the same thermal environment, and since the resistances of thermistors 34a and 34b have now been equalized, it is apparent that the power supplied to the wafer 14 by the power amplifier 64 is equal to the power of electromagnetic radiation from the sun incident on the wafer 12. Thus, be measuring the output of the amplifier 64 the intensity of electromagnetic radiation from the sun may be accurately measured. Means for determining the output from the amplifier 64 have been fully described above.

Assume now that the intensity of electromagnetic radiation from the sun decreases. This will produce a negative signal between points A and B in the circuit 50 which in turn will produce a negative output signal from the signal amplifier 60. The scanner circuit 62 will again be activated, but will now produce a negative voltage ramp in response to the negative input signal. This is illustrated by the "Y" portion of the graph in FIG. 5. The negative voltage ramp will scan downward thus decreasing the power applied to the heater wafer 14 until such time as the temperature sensed by the thermistors 34a and 34b are once again equalized, at which point the ramp will level off as described above. This is shown by the "Z" portion of the graph in FIG. 5. It is thus apparent that the balancing radiometer of the present invention will provide a continuous measurement of the intensity of electromagnetic radiation from an unknown source such as the sun regardless of whether the intensity of radiation from the source should increase or decrease.

By employing the above-described invention a number of advantages are enjoyed. First, since the thermistors are disposed in direct thermal conducting relation with the wafers, substantially all the heat detected by the wafers is transmitted to the thermistors. This arrangement also prevents "cross talk" between the two wafers, that is, the heat generated in one wafer is not detected by the thermistor associated with the other. Thermally insulating base 28 further enhances this advantage. Moreover, because the wafers and their associated thermistors need not be disposed in a housing, their thermal environment is maintained at ambient temperature. This precludes "noise" levels from becoming so high that the temperature difference signal becomes unintelligible.

Because the lines of electromagnetic flux incident on the solar wafer 12 are substantially uniform, it is important that the heating of the ohmic material 18b of heater wafer 14 also be substantially uniform. By employing rectangular wafers, such as square wafers 12 and 14 and distributing the electrodes 37 along a pair of opposite edges as shown in FIG. 1 and described above, substantially uniform heating of the ohmic material 18b of the wafer 14 is insured. As presently preferred the wafers 12 and 14 each comprise a square of approximately 1½ inches on a side.

In order to maintain the accuracy of the balancing radiometer 10 of the present invention it is important that the thermistors 34a and 34b be identical, that is, that the resistances of these thermistors vary identically with temperature. It has been found that thermistors such as Model # UUA 35J3 manufactured by Omega Engineering are accurate within temperature variations as small as 1/10 of 1° F. The radiometer 10 is thus capable of providing highly accurate radiation measurements.

In order to avoid the application of dangerously high voltage levels to the heater wafer 14 it is desirable that the resistance of the ohmic material 18b be sufficiently low. Preferably the resistance across the ohmic material 18b is about 100 ohms, though any value not exceeding about 2,000 ohms is acceptable. Of course, the radiometer will function correctly even if the resistance across the ohmic material 18 is greater than 2,000 ohms as long as the resistances of materials 18a and 18b are substantially identical. It will of course, be apparent to the skilled art worker that for any given material the resistance across the layer 18 may be reduced by increasing the thickness of the layer.

Preferably, wafers 12 and 14 will both be provided with electrodes and means for selectively connecting the power amplifier 64 thereto (not shown). In this way, the functions of the wafers 12 and 14 may be readily interchanged during operation of the radiometer. All that would be required is that the shield 24 be moved from the wafer 14 to the wafer 12 or vice versa. By interchanging the functions of the wafers 12 and 14 the relative calibration of the thermistors 34a and 34b may be compared. Thus, assuming the bridge circuit 50 has been equalized with the wafer 12 acting as the solar wafer and the wafer 14 acting as the heater wafer, the bridge circuit should remain equalized when the functions of the two wafers are interchanged. If it does not, this will indicate that one or both of the thermistors 34 are not functioning properly. Moreover, providing both wafers with electrodes insures that the wafers will be identical, which as noted above, is essential to the accuracy of the device.

It will be apparent to the skilled art worker that a variety of changes may be made in the construction of the present invention. For example, any material whose resistance is dependent on its temperature may be substituted for the thermistors 34. Thus, additional layers of ohmic material disposed beneath the substrates may be employed. Such material would preferably be deposited directly on the undersurfaces of the substrates in order to insure good thermal conductivity. It would, of course, be necessary that the resistances of these additional layers of ohmic material vary in a substantially identical manner with temperature.

Further, the electrodes 37 may comprise tabs extending outwardly from the ohmic material 18b. Such tabs would be affixed to the ohmic material 18 by an electrically conductive adhesive and would preferably extend along opposite sides of the wafer 14 for reasons more fully described above.

While I have herein shown and described the preferred embodiment of the present invention and have suggested modifications therein, other changes and modifications may be made therein within the scope of the appended claims without departing from the spirit and scope of this invention.

What is claimed is:

1. A balancing radiometer for measuring the intensity of a source of electromagnetic radiation comprising:
   a. a pair of substantially identical electromagnetic radiation sensors, each of said sensors including:
   i. a thermally conductive substrate, at least one surface of said substrate being comprised of an electrically insulating material, said at least one surface being disposable in confronting relation with said radiation source; and
   ii. means disposed on said at least one surface of said substrate for resisting the flow of electric current and absorbing incident radiation;
   b. means for shielding one of said pair of sensors from said radiation source, the other of said sensors being unshielded;
   c. first means disposed in thermal conducting relation with the substrate of said shielded sensor for providing a first signal proportional to the temperature of said shielded sensor;
   d. second means disposed in thermal conducting relation with the substrate of said unshielded sensor for providing a second signal proportional to the temperature of said unshielded sensor;
   e. means for comparing said first and second signals;
   f. variable power supply means responsive to said signal comparing means;
   g. means for connecting said power supply means to said electric current flow resisting means for heating said shielded sensor to a temperature equal to the temperature of said unshielded sensor whereby to equalize said first and said second signals; and
   h. means for measuring the power output of said power supply means.

2. The balancing radiometer of claim 1 wherein said substrate comprises paper, and wherein said current resisting and radiation absorbing means comprises graphite.

3. The balancing radiometer of claim 2 wherein said signal comparing means comprises a Wheatstone bridge, two arms of said bridge being comprised of two thermistors, the other arms of said bridge being comprised of two equal resistances, whereby the difference in voltage between the point intermediate the first mentioned two arms and the point intermediate the other two arms is proportional to the difference between said first and second signals.

4. The balancing radiometer of claim 1 wherein said current resisting and radiation absorbing means comprises an ohmic material on said one surface, and a layer of radiation absorption material on the exposed surface of said ohmic material.

5. The balancing radiometer of claim 4 wherein said means for connecting said power supply means to said shielded sensor comprises:
   a pair of electrodes disposed in electrical conducting relation with said ohmic material of said shielded sensor; and
   wire means for connecting said electrodes to the output of said power supply means.

6. The balancing radiometer of claim 5 wherein each of said sensors is rectangular in shape, and wherein said pair of electrodes is disposed along a pair of opposite edges of said shielded sensor.

7. The balancing radiometer of claim 1 wherein said first signal providing means comprises a first thermistor secured to the center of the surface of the substrate of said shielded sensor opposite said one surface, and wherein said second signal providing means comprises a second thermistor affixed to the center of the surface of the substrate of said unshielded sensor opposite said one surface.

8. The balancing radiometer of claim 7 wherein said variable power supply means comprises:
   means for amplifying said voltage difference signal;
   means connected to said amplifying means for generating a continuous voltage scan dependent on the polarity of the output of said voltage difference amplifier, said generating means including means for discontinuing said scan when said voltage difference signal is zero; and means for amplifying said generated signal, said amplified generated signal comprising the output of said variable power supply means.

9. The balancing radiometer of claim 1 wherein said shielding means comprises a metallic sheet interposed between said one of said pair of sensors and said source of electromagnetic radiation, the surface of said sheet in confronting relation with said source being radiation reflective the opposite surface of said sheet being radiation absorptive.

10. The balancing radiometer of claim 1 and further comprising a thermally insulating base, said sensors being juxtaposed on said base.

* * * * *